United States Patent
Kamee et al.

(10) Patent No.: US 9,631,794 B2
(45) Date of Patent: Apr. 25, 2017

(54) LIGHTING APPARATUS

(71) Applicant: OLYMPUS CORPORATION, Tokyo (JP)

(72) Inventors: Hiroyuki Kamee, Koganei (JP); Takeshi Ito, Hino (JP); Hiroyuki Seki, Hachioji (JP); Norio Nakaya, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 122 days.

(21) Appl. No.: 14/101,767

(22) Filed: Dec. 10, 2013

(65) Prior Publication Data

US 2014/0098541 A1 Apr. 10, 2014

Related U.S. Application Data

(63) Continuation of application No. PCT/JP2012/064900, filed on Jun. 11, 2012.

(30) Foreign Application Priority Data

Jun. 13, 2011 (JP) ................................ 2011-131483

(51) Int. Cl.
*F21V 13/08* (2006.01)
*F21V 9/16* (2006.01)
(Continued)

(52) U.S. Cl.
CPC ................ *F21V 13/08* (2013.01); *F21V 9/16* (2013.01); *G02B 6/0008* (2013.01);
(Continued)

(58) Field of Classification Search
CPC ..... G02B 6/0008; G02B 6/0003; F21V 13/08; F21V 9/16
(Continued)

(56) References Cited

U.S. PATENT DOCUMENTS 7,837,348 B2 * 11/2010 Narendran et al. ........... 362/231
8,096,668 B2 * 1/2012 Abu-Ageel .......... G02B 3/0006
362/296.01
(Continued)

FOREIGN PATENT DOCUMENTS

JP   2006-261028 A   9/2006
JP   2009-003228 A   1/2009
(Continued)

OTHER PUBLICATIONS

International Search Report dated Sep. 11, 2012 issued in PCT/JP2012/064900.
(Continued)

*Primary Examiner* — Elmito Breval
*Assistant Examiner* — Arman B Fallahkhair
(74) *Attorney, Agent, or Firm* — Scully, Scott, Murphy & Presser, P.C.

(57) ABSTRACT

A wavelength converting unit includes: an incident portion configured to be connected to an excited-light emitting end of a excited-light source, and on which excited light emitted from the excited-light source is made incident; a wavelength converting member configured to convert the excited light into wavelength-converted light of a desired wavelength; a light transmitting member configured to transmit the excited light and the wavelength-converted light; a reflector configured to reflect at least part of the wavelength-converted light; and an emitting portion configured to emit at least part of the at least part of the wavelength-converted light reflected by the reflector to outside. At least part of the light transmitting member is continuously formed to extend from the incident portion to the emitting portion, and part of an external surface of the light transmitting member has the reflector.

11 Claims, 3 Drawing Sheets

(51) Int. Cl.
*F21V 8/00* (2006.01)
*F21Y 101/00* (2016.01)
*F21Y 115/30* (2016.01)

(52) U.S. Cl.
CPC ....... *F21Y 2101/00* (2013.01); *F21Y 2115/30* (2016.08); *G02B 6/0003* (2013.01)

(58) Field of Classification Search
USPC ...... 362/293, 84, 2, 553, 231, 510, 614, 230
See application file for complete search history.

(56) References Cited

U.S. PATENT DOCUMENTS

| | | | |
|---|---|---|---|
| 9,341,344 B2* | 5/2016 | Kamee | A61B 1/0653 |
| 2009/0003400 A1 | 1/2009 | Nagahama et al. | |
| 2009/0175043 A1* | 7/2009 | Frick | 362/347 |
| 2009/0296018 A1* | 12/2009 | Harle et al. | 349/61 |
| 2011/0141763 A1* | 6/2011 | Kamee et al. | 362/583 |
| 2011/0280033 A1* | 11/2011 | Kishimoto et al. | 362/543 |
| 2011/0292636 A1* | 12/2011 | Fukai et al. | 362/19 |
| 2014/0071691 A1* | 3/2014 | Ito et al. | 362/308 |

FOREIGN PATENT DOCUMENTS

| | | |
|---|---|---|
| JP | 2011-021062 A | 2/2011 |
| JP | 2011-066069 A | 3/2011 |
| JP | 2011-129374 A | 6/2011 |
| JP | 2011-253015 A | 12/2011 |
| JP | 2012-074241 A | 4/2012 |
| WO | WO 2006/038502 A1 | 4/2006 |
| WO | 2007/105647 A1 | 9/2007 |

OTHER PUBLICATIONS

Japanese Office Action dated Sep. 1, 2015 from related Japanese Patent Application No. 2011-131483, together with an English language translation.

* cited by examiner

LIGHTING APPARATUS

CROSS-REFERENCE TO RELATED APPLICATIONS

This is a Continuation application of PCT Application No. PCT/JP2012/064900, filed Jun. 11, 2012, which was published under PCT Article 21(2) in Japanese.

This application is based upon and claims the benefit of priority from prior Japanese Patent Application No. 2011-131483, filed Jun. 13, 2011, the entire contents of which are incorporated herein by reference.

BACKGROUND OF THE INVENTION

1. Field of the Invention

The present invention relates to a lighting apparatus.

2. Description of the Related Art

Nowadays, a fiber light source formed of a combination of a small solid light source and an optical fiber is being developed. The fiber light source is used as a lighting apparatus which emits light from a distal end of a thin structure.

As such a lighting apparatus, for example, Jpn. Pat. Appln. KOKAI Pub. No. 2009-3228 presents a fiber light source apparatus (light-emitting apparatus) using a solid light source.

In the fiber light source apparatus disclosed in Jpn. Pat. Appln. KOKAI Pub. No. 2009-3228, a light guide member (optical fiber) is connected to a small solid light source, and a wavelength converting member (fluorescent material) is attached to a distal end of the light guide member. The light guide member is attached to a retaining member, and a spacer is placed between the light guide member and the wavelength converting member. The spacer includes a through hole, and a metal thin film is formed on an internal surface of the through hole. In the fiber light source apparatus, a backward emitted light emitted from the wavelength converting member toward the light guide member is reflected by a reflector formed of the metal thin film provided on the internal surface of the through hole of the spacer. Thereby, the light emitted toward the light guide member is returned toward the wavelength converting member, and thereby the illumination light quantity of the wavelength-converted light is increased.

The fiber light source apparatus disclosed in Jpn. Pat. Appln. KOKAI Pub. No. 2009-3228 includes a light-emitting element, a light guide member which guides light from the light-emitting element, a retaining member attached to at least an emitting end of the light guide member, and a wavelength converting member which is provided on the emitting side of the light guide member, absorbs at least part of the light from the light-emitting element, and converts the light into light of a different wavelength. The fiber light source apparatus has a structure in which a spacer which reflects backward emitted light emitted from the wavelength converting member is attached to a part between the retaining member or the light guide member and the wavelength converting member. By virtue of this structure, it is possible to reduce a loss of light due to incidence of light reflected or generated by the wavelength converting member on an end surface of the retaining member, and improve the light output. Thus, it is possible to improve brightness, by providing means for reflecting backward emitted light, which was not efficiently used before, toward a direction in which the light is to be output.

The above fiber light source apparatus has a structure in which the whole surface of the emitting opening of the spacer is covered with the wavelength converting member. Thus, the backward emitted light reflected by the reflector being the internal surface of the through hole of the spacer passes through the wavelength converting member, and is output to the exterior. However, the wavelength converting member generally has self-absorbability, and thus absorbs part of the wavelength-converted light which has been wavelength-converted by the wavelength converting member. This absorption reduces the light quantity of the wavelength-converted light emitted to the exterior. Thus, the structure of the above fiber light source apparatus has a problem that the wavelength-converted light from the wavelength converting member is not sufficiently used, and the light extraction efficiency is improved to a lesser degree than expected.

BRIEF SUMMARY OF THE INVENTION

The present invention has been made in view of the above point. An object of the present invention is to provide a lighting apparatus with improved light extraction efficiency for wavelength-converted light.

According to a first aspect of the invention, there is provided a lighting apparatus comprising:
a light source configured to emit light-source light;
a first optical member configured to convert the light-source light into a wavelength-converted light of a desired wavelength, and emit the wavelength-converted light toward the light source; and
a second optical member configured to emit the wavelength-converted light toward the first optical member again,
the first optical member includes:
a first area forming an area on which the wavelength-converted light emitted from the second optical member is made incident; and
a second area forming a boundary between the area on which the wavelength-converted light emitted from the second optical member is made incident and an area on which the wavelength-converted light is not made incident.

According to a second aspect of the invention, there is provided a lighting apparatus comprising:
an excited-light source including an excited-light emitting end; and
a wavelength converting unit, wherein
the wavelength converting unit includes:
an incident portion configured to be connected to the excited-light emitting end, and on which excited light emitted from the excited-light source is made incident;
a wavelength converting member configured to convert the excited light made incident on the incident portion into wavelength-converted light of a desired wavelength;
a light transmitting member configured to transmit the excited light and the wavelength-converted light;
a reflector configured to reflect at least part of the wavelength-converted light from the wavelength converting member; and
an emitting portion configured to emit at least part of the at least part of the wavelength-converted light reflected by the reflector to outside, and
at least part of the light transmitting member is continuously formed to extend from the incident portion to the emitting portion, and part of an external surface of the light transmitting member has the reflector.

According to the present invention, a lighting apparatus with improved light extraction efficiency for wavelength-converted light, is provided.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments for carrying out the present invention will now be described with reference to drawings.

First Embodiment

Figure 1:
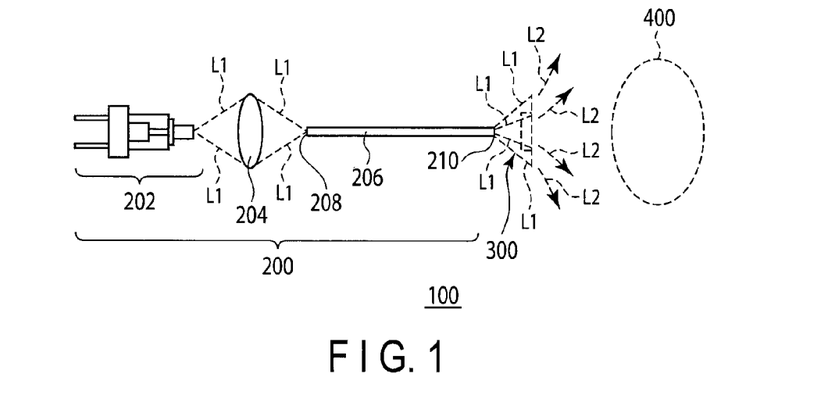
FIG. 1 is a diagram illustrating a schematic structure of a lighting apparatus according to a first embodiment of the present invention.
Figure 2A:
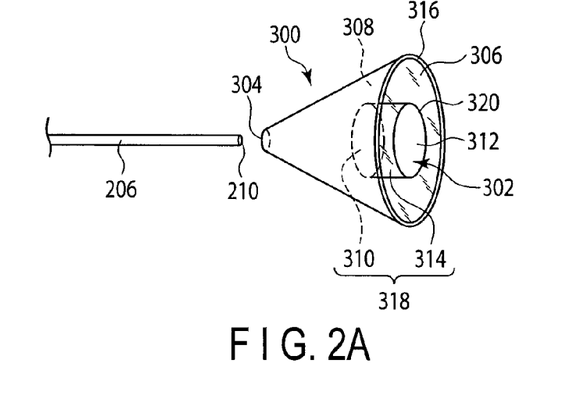
FIG. 2A is an enlarged perspective view of a wavelength converting unit and a light guide member illustrated in FIG. 1.

A lighting apparatus according to a first embodiment of the present invention will now be explained by using FIG. 1 and FIGS. 2A to 2C. In FIG. 1 and FIG. 2A, illustration of part of the members is omitted. In FIG. 2A, a light guide member is separated from an incident portion of a wavelength converting unit, for ease of understanding.

As illustrated in FIG. 1, a lighting apparatus 100 according to a first embodiment is mainly divided into a light source module 200 and a wavelength converting unit, 300, and has a structure in which excited light emitted from the light source module 200 is applied to a wavelength converting member 302 serving as a first optical member located in the wavelength converting unit 300. Detailed structures of the constituent elements will be explained hereinafter.

The light source module 200 includes a semiconductor laser light source 202, a condensing lens 204, and a light guide member 206. The semiconductor laser light source 202 emits excited light, and the condensing lens 204 condenses the excited light to an excited-light incident end 208 of the light guide member 206. For example, a multi-mode optical fiber having a core diameter of 50 μm and a numerical aperture FNA of 0.2 is used as the light guide member 206. The excited light is emitted as light-source light from an excited-light emitting end 210 of the light guide member 206.

Figure 2B:
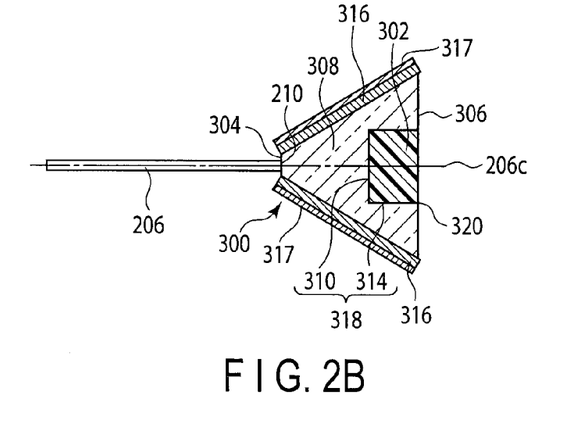
FIG. 2B is an enlarged cross-sectional view of the wavelength converting unit and the light guide member illustrated in FIG. 1.

The wavelength converting unit 300 includes an incident portion 304, on which the excited light is made incident from the excited-light emitting end 210 of the light guide member 206 of the light source module 200, and an emitting portion 306 having a function of emitting desired illumination light to an irradiation object 400. The wavelength converting unit 300 also includes a wavelength converting member 302 being a first optical member, and a light transmitting member 308, and converts the excited light L1 guided by the light guide member 206 into wavelength-converted light L2 having a desired wavelength.

The wavelength converting member 302 has a cylindrical shape, and includes a bottom surface 310 facing the excited-light emitting end 210 of the light guide member 206, an upper surface 312 opposed to the bottom surface 310, and a side surface 314 held between the bottom surface 310 and the upper surface 312. The bottom surface 310 is located separately from the excited-light emitting end 210.

The light transmitting member 308 is formed to surround the side surface 314 and the bottom surface 310 of the wavelength converting member 302. In other words, the light transmitting member 308 has a circular truncated cone shape, in which the incident portion 304 serves as a first surface having a minor diameter of the circular truncated cone, the emitting portion 306 serves as a second surface having a major diameter of the circular truncated cone, and the side surface serves as a tapered surface of the circular truncated cone. The light transmitting member 308 has a property of transmitting both the excited light L1 and the wavelength-converted light L2 emitted from the wavelength converting member 302. A reflector 316 serving as a second optical member is formed on the side surface of the light transmitting member 308, that is, an inclined surface of the circular truncated cone.

The reflector 316 has a function of performing regular reflection or diffuse reflection for the incident light made incident on the reflector 316, and converting the incident light into reflected light. In the present embodiment, the incident light is the wavelength-converted light L2, which has been subjected to wavelength conversion by the wavelength converting member 302, and the reflected light is the wavelength-converted light L2, a traveling direction of which has been changed by regular reflection or diffuse reflection by the reflector 316. Although an ideal reflection surface can achieve pure regular reflection or diffuse reflection, regular-reflection components and diffuse-reflection components are mixed in many cases. In the present invention, various reflectors, from pure regular reflectors to pure diffuse reflectors may be used. A reflector which achieves reflection close to pure regular reflection may be manufactured by forming a metal thin film. Thereby, it is possible to manufacture reflector 316 which can easily guide more reflected light toward the emitting portion 306, with good use of the tapered shape. A reflector which achieves reflection close to pure diffuse reflection can be manufactured by applying powder of an oxide or a resin to it. Thereby, it is possible to manufacture reflector 316 which is hardly influenced by the shape of the reflector 316. Such a reflector 316 may be formed on only part of the side surface of the light transmitting member 308, not the whole side surface. In the present embodiment, the reflector 316 is formed on the whole side surface of the light transmitting member 308.

Figure 2C:
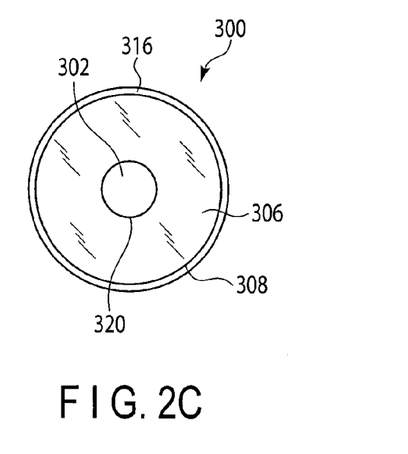
FIG. 2C is a front view of the wavelength converting unit of FIG. 1, as viewed from an emitting end side.

The upper surface 312 of the cylindrical wavelength converting member 302 has an area smaller than that of the emitting portion 306, and is disposed almost concentrically with the emitting portion 306. By adopting such arrangement, the wavelength converting member 302 is disposed separately from the reflector 316, through the whole circumference thereof. The upper surface 312 forms part of an opening surface of the emitting portion 306. The wavelength converting member 302 is designed to have a thickness to sufficiently convert excited light L1 into wavelength-converted light L2.

In the present embodiment, since the light transmitting member 308 is filled between the wavelength converting member 302 and the reflector 316, the light transmitting member 308 is formed around the whole side circumference of the wavelength converting member 302, and extends from the incident portion 304 to the emitting portion 306.

The excited-light emitting end 210 of the light guide member 306 is connected to the incident portion 304, such that the excited light L1 is made incident on the incident portion 304. More specifically, the excited-light emitting end 210 is connected to a center part of the incident portion 304 serving as the first surface of the circular truncated cone of the light transmitting member 308.

Relative positions of the excited-light emitting end 210 and the wavelength converting member 302 are determined, by setting the size of the light transmitting member 308 and the size of the wavelength converting member 302, such that almost all the excited light L1 emitted from the excited-light emitting end 210 is applied onto the bottom surface 310 of the wavelength converting member 302. In the setting, a beam spot formed by the excited light L1 emitted from the light guide member 206 on a plane including the bottom surface 310 of the wavelength converting member 302 is configured to be smaller than the bottom surface 310 of the wavelength converting member 302. The beam spot is defined as an area having a light intensity larger than $1/e^2$ of the maximum intensity of the excited light, where "e" is Napier's constant serving as a base of a natural logarithm.

Preferable examples of shapes and materials of the members will be explained hereinafter.

A taper angle of the light transmitting member 308 is preferably 20 degrees with respect to a central axis 206C of the light guide member 206. The wavelength converting member 302 preferably has a cylindrical shape having a radius of 0.17 mm and a thickness of 0.5 mm. By adopting the above structure, a distance from the incident portion 304 to the bottom surface 310 of the wavelength converting member 302 is about 0.6 mm. The multi-mode optical fiber described above is used as the light guide member 206.

The light transmitting member 308 is preferably formed of a transparent material, such as ordinary glass and quartz glass. By selecting such a material, the light transmitting member 308 can efficiently transmit excited light or wavelength-converted light, and more illumination light can be emitted from the emitting portion 306.

To form the reflector 316 on the side surface of the light transmitting member 308, it is desirable to deposit a reflecting material on a sample obtained by masking the upper and lower surfaces of the light transmitting member 308, or plate the sample with a reflecting material. As the reflecting material, it is desirable to use a metal film that can be easily formed on the side surface of the light transmitting member 308 and has high reflectance for visible light. More desirably, aluminum or silver should be selected as the reflecting material. Reflecting materials such as aluminum and silver deteriorate in reflectance when they are left in air, since they become frosted or discolored. In serious cases, the frost or discoloration may reach the light transmitting member 308, and deteriorate its function as the reflecting surface. Thus, it is desirable to form a protective film 317 on an upper surface of the reflecting material formed by deposition or plating, as illustrated in FIG. 2B. The protective film 317 is preferably $SiO_2$ or copper and the like. An example of the wavelength converting member 302 is a member obtained by dispersing a powder fluorescent material having an average grain diameter of 8 μm and a concentration of 10 wt % into silicone resin, and curing the resin.

[Operation]

The behavior of excited light L1 from the light source module 200 will be explained hereinafter.

First, excited light L1 emitted from the semiconductor laser light source 202 passes through the condensing lens 204, and is made incident on the light guide member 206 from the excited-light incident end 208 with high efficiency.

The excited light L1 made incident on the light guide member 206 is guided through the inside of the light guide member 206, and emitted from the excited-light emitting end 210 of the light guide member 206 toward the light transmitting member 308. In this operation, the excited light L1 is emitted at a divergence angle obtained in accordance with a numerical aperture (NA) of the light guide member 206 and the refractive index of the light transmitting member 308.

The emitted excited light L1 is transmitted through the light transmitting member 308, and applied onto the bottom surface 310 of the wavelength converting member 302. In this operation, most of the excited light L1 is applied onto the wavelength converting member 302, since the bottom surface 310 of the wavelength converting member 302 is configured to be larger in size than the beam spot formed by the excited light on a plane including the bottom surface 310 of the wavelength converting member 302. As a result, little excited light is directly emitted to the exterior without going through the wavelength converting member 302.

The excited light L1 is applied to the wavelength converting member 302, and converted into wavelength-converted light L2 having a wavelength different from that of the excited light L1, while being transmitted and scattered inside the wavelength converting member 302. In this operation, the wavelength-converted light L2 is emitted in all directions, regardless of the incident direction of the excited light L1. Part of the wavelength-converted light L2 is directly applied to the exterior irradiation object 400 from the upper surface 312 of the wavelength converting member 302, or from a boundary part between the side surface 314 and the upper surface 312. Another part of the wavelength-converted light L2 is applied to the exterior irradiation object 400 from the emitting portion 306, through the side surface 314 of the wavelength converting member 302 and the light transmitting member 308. In the following explanation, the bottom surface 310 and the side surface 314 of the wavelength converting member 302 are referred to as a first region 318 of the first optical member, and the boundary part between the side surface 314 and the upper surface 312 is referred to as a second region 320 of the first optical member.

Another part of the wavelength-converted light L2 is emitted from the first region 318 or the second region 320 of the wavelength converting member 302 toward the light transmitting member 308. The wavelength-converted light L2 emitted from the first region 318 or the second region 320 toward the light transmitting member 308 is transmitted through the light transmitting member 308, and thereafter part of it is reflected by the reflector 316 formed on the side surface of the light transmitting member 308. Since the reflector 316 is a tapered surface spreading toward the emitting portion 306, that is, toward the irradiation object 400, the wavelength-converted light L2 reflected by the reflector 316 has more components going toward the emitting portion 306 than components going toward the original moving direction.

More specifically, part of the wavelength-converted light L2 reflected by the reflector 316 goes toward the reflector 316 again, another part thereof goes toward the wavelength converting member 302, and the rest thereof is applied to the exterior irradiation object 400 from the emitting portion 306 through the light transmitting member 308.

Part of the wavelength-converted light L2 once reflected by the reflector 316 and emitted toward the reflector 316 again repeats the above step again and further goes toward the reflector 316, another part thereof goes toward the wavelength converting member 302, and the rest thereof is emitted from the emitting portion 306 to the exterior.

The wavelength-converted light L2 going toward the reflector 316 and the wavelength converting member 302 repeats the above process thereafter.

Of the part of the wavelength-converted light L2 going from the reflector 316 toward the wavelength converting member 302, the wavelength-converted light L2 going toward the first region 318 is made incident on the wavelength converting member 302, while the wavelength-converted light L2 going toward the second region 320 is not made incident on the wavelength converting member 302 but emitted to the exterior from the emitting portion 306. Specifically, although the bottom surface 310 and the side surface 314 serving as the first region 318 of the wavelength converting member 302 form a first area on which wavelength-converted light emitted from the reflector 316 being the second optical member is made incident, the boundary part between the side surface 314 and the upper surface 312, which is the second region 320 of the wavelength converting member 302, form a second area, on which no wavelength-converted light is made incident, together with the upper surface 312 of the wavelength converting member 302.

[Functions and Effects]

As described above, parts of the wavelength-converted light which have been emitted from the first region 318 being the side surface 314 and the bottom surface 310 of the wavelength converting member 302 and from the second region 320 being the boundary part between the upper surface 312 and the light transmitting member 308 are not made incident on the wavelength converting member 302 again, but pass through the light transmitting member 308 and are emitted from the emitting portion 306 to the exterior. Since the light is less reduced in light quantity due to self absorption of the wavelength converting member 302, it is possible to achieve a lighting apparatus 100 with high extraction efficiency for the wavelength-converted light. In particular, wavelength-converted light is emitted at a higher rate from the bottom surface 310, to which the excited light is directed applied, than the other surfaces. Part of the wavelength-converted light L2 emitted from the bottom surface 310 is emitted to the light transmitting member 308 disposed closer to the light source module 200 than the wavelength converting member 302 is, and can be applied to the exterior irradiation object 400 with high light usage efficiency, through the reflector 316, the light transmitting member 308, and the emitting portion 306, without being made incident on the wavelength converting member 302.

In addition, the reflector 316 and the wavelength converting member 302 are arranged separately from each other, through the whole side periphery of the wavelength converting member 302. Thus, the wavelength-converted light is not made incident on the wavelength converting member 302 again but emitted from the emitting portion 306 at a high rate, and thus the light usage efficiency is further improved.

Further, since the light transmitting member 308 is formed of glass or resin having high transmittance for excited light and wavelength-converted light, loss of the excited light and the wavelength-converted light by the light transmitting member 308 is reduced, and the light usage efficiency is further improved.

The light transmitting member 308 has a circular truncated cone shape, which spreads from the incident portion 304 toward the emitting portion 306. Thus, the emitting direction is oriented to the direction of the emitting portion 306 whenever the wavelength-converted light is reflected by the reflector 316 formed on the whole side surface, and thus the light usage efficiency is further improved.

In addition, since the bottom surface 310 and the side surface 314 of the wavelength converting member 302 contact the light transmitting member 308, a difference in the refractive index in the interface between the light transmitting member 308 and the bottom surface 310 and side surface 314 is small, and the wavelength-converted light generated inside the wavelength converting member 302 is easily emitted to the light transmitting member 308. Thus, the wavelength-converted light hardly remains in the wavelength converting member 302, and the light usage efficiency is further improved.

The wavelength converting member 302 has a cylindrical shape, and the bottom surface 310 is larger than a beam spot generated by application of the excited light. Thereby, the excited light is efficiently applied to the wavelength converting member 302 and converted into wavelength-converted light, and thus the light usage efficiency is further improved.

The reflector 316 is formed on the whole side surface of the light transmitting member 308. Thereby, the wavelength-converted light is neither emitted to the exterior from members other than the emitting portion 306, nor absorbed into the other members. Thus, the light from the emitting portion 306 has high usage efficiency.

Since a metal having high reflectance for visible light is used for the reflector 316, light is less absorbed into the reflector 316 when reflected by the reflector 316, and the light usage efficiency is improved.

Since the reflector 316 is directly formed on the side surface of the light transmitting member 308, the wavelength-converted light L2 does not leak out of the light transmitting member 308, i.e., is not influenced by the structure outside the reflector 316 in reflection. As a result, the wavelength-converted light L2 is reflected with high efficiency without being transmitted through an adhesive or the like, in comparison with the structure in which the reflector 316 is formed separately from the light transmitting member 308 and adhered to the light transmitting member 308. Thus, light loss is reduced, and the light usage efficiency is improved.

In addition, in the present embodiment, the light transmitting member 308 contacts the wavelength-converting member 302 at two parts, that is, the first region 318 and the second region 320. Thus, the wavelength converting member 302 does not fall out, and it is possible to provide lighting apparatus 100 with high reliability.

According to the above structure, it is possible to provide lighting apparatus 100 with high usage efficiency for the excited light L1, and with high extraction efficiency for the wavelength-converted light L2.

[Modification]

In the first embodiment, the light transmitting member 308 has a circular truncated cone shape, in which the incident portion 304 serves as a first surface having a minor diameter of the circular truncated cone, the emitting portion 306 serves as a second surface having a major diameter of the circular truncated cone, and the side surface serves as a tapered surface of the circular truncated cone. However, the light transmitting member 308 may not have a circular truncated cone shape. For example, as illustrated in FIG. 3, even when the light transmitting member 308 is formed with a cylindrical shape in which the first surface and the second surface have the same size, the light transmitting member 308 operates in the same manner as in the case of having a circular truncated cone shape, and has the same effect.

Figure 3:
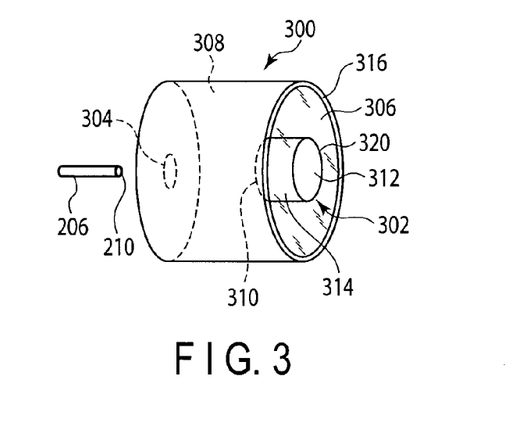
FIG. 3 is an enlarged perspective view of a wavelength converting unit and a light guide member according to a modification of the first embodiment.
Figure 4A:
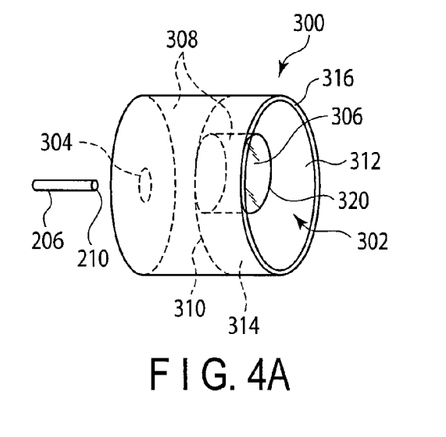
FIG. 4A is an enlarged perspective view of a wavelength converting unit and a light guide member of a lighting apparatus according to a second embodiment of the present invention.
Figure 4B:
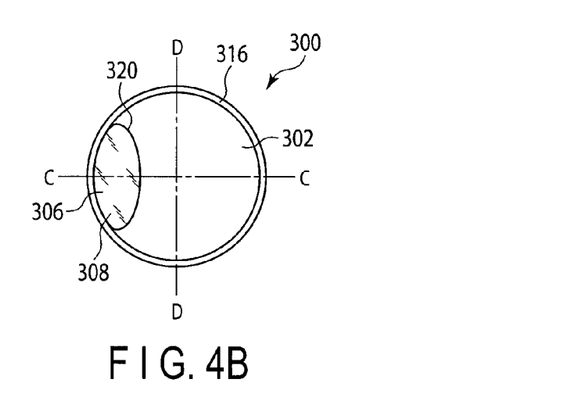
FIG. 4B is a front view of the wavelength converting unit of FIG. 4A, as viewed from an emitting end side.
Figure 4C:
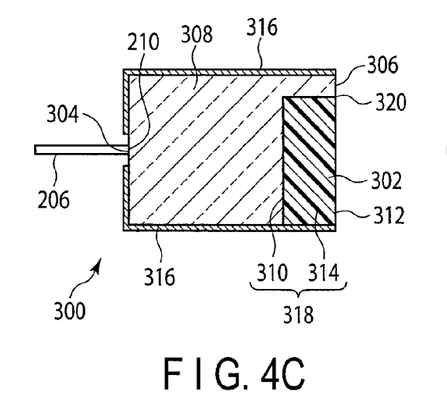
FIG. 4C is an enlarged cross-sectional view of the wavelength converting unit and the light guide member, taken along line C-C of FIG. 4B.
Figure 4D:
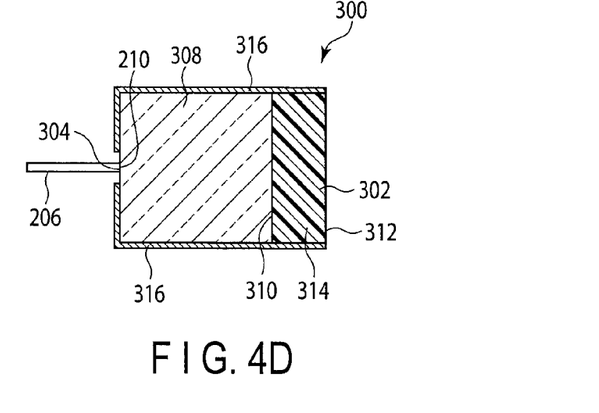
FIG. 4D is an enlarged cross-sectional view of the wavelength converting unit and the light guide member, taken along line D-D of FIG. 4B.
Figure 5A:
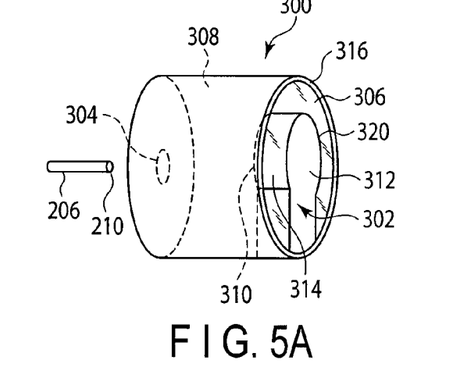
FIG. 5A an enlarged perspective view of a wavelength converting unit and a light guide member of a modification of the lighting apparatus according to the second embodiment.
Figure 5B:
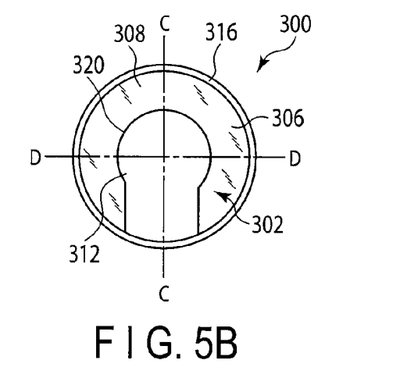
FIG. 5B is a front view of the wavelength converting unit of FIG. 5A, as viewed from an emitting end side.
Figure 5C:
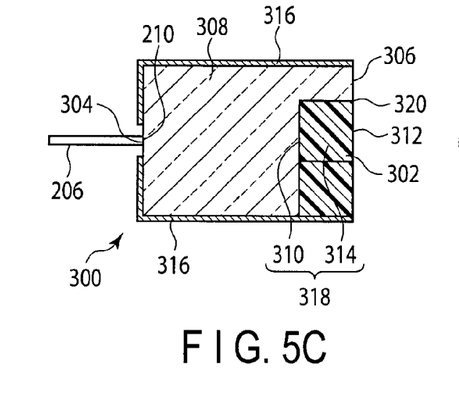
FIG. 5C is an enlarged cross-sectional view of the wavelength converting unit and the light guide member, taken along line C-C of FIG. 5B.
Figure 5D:
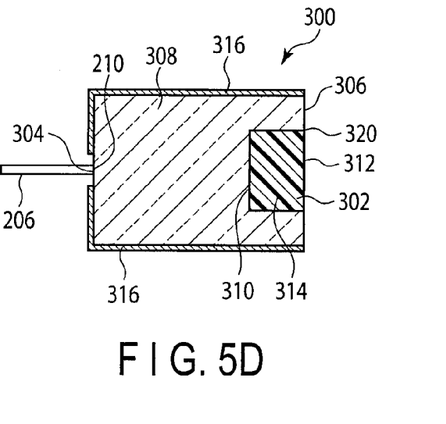
FIG. 5D is an enlarged cross-sectional view of the wavelength converting unit and the light guide member, taken along line D-D of FIG. 5B.

In FIG. 3, the light guide member 206 is illustrated separately from the incident portion 304 of the wavelength converting unit 300, for ease of understanding.

In this case, the reflector 316 is also directly formed on the first surface excluding the incident portion 304, as well as the side surface of the light transmitting member 308, as a matter of course.

Second Embodiment

The above first embodiment is an example in which the light transmitting member 308 is placed through the whole side periphery of the wavelength converting member 302. However, the light transmitting member 308 can produce a similar effect, although it is smaller than the effect obtained by the first embodiment, as long as the light transmitting member 308 is placed on part of the side of the wavelength converting member 302 and consequently part of the light transmitting member 308 is continuously formed from the incident portion 304 to the emitting portion 306.

FIGS. 4A to 4D and FIGS. 5A to 5D illustrate an example in which an area of a light transmitting member 308 extending from an incident portion 304 to an emitting portion 306 of a wavelength converting unit 300 surrounds a wavelength converting member 302.

In this case, the emitting portion 306 is a whole external surface on the same plane as an upper surface 312 of the wavelength converting member 302, in the light transmitting member 308 formed continuously. Part of the wavelength-converted light reflected by a reflector 316 is emitted from the whole surface to the exterior.

In these examples, the reflector 316 is formed on a first surface of the wavelength converting unit 300 excluding the incident portion 304, and whole side surfaces of the wavelength converting member 302 and the light transmitting member 308, excluding a part in which the side surface of the wavelength converting member 302 contacts the light transmitting member 308. The reflector 316 may not be formed on the other side surfaces of the wavelength converting member 302, as a matter of course.

In addition, the reflector 316 may not be formed on the whole area extending over the all of the side surface of the light transmitting member 308. The desired effect is obtained, as long as the reflector 316 is formed on at least part of the area.

Third Embodiment

In the above first and second embodiments, the wavelength converting member 302 is placed such that the upper surface 312 is in contact with a surface of the light transmitting member 308 located on the emitting portion 306. However, the light converting member 302 may be placed such that the bottom surface 310 is in contact with the surface of the light transmitting member 308 located on the emitting portion 306.

Figure 6:
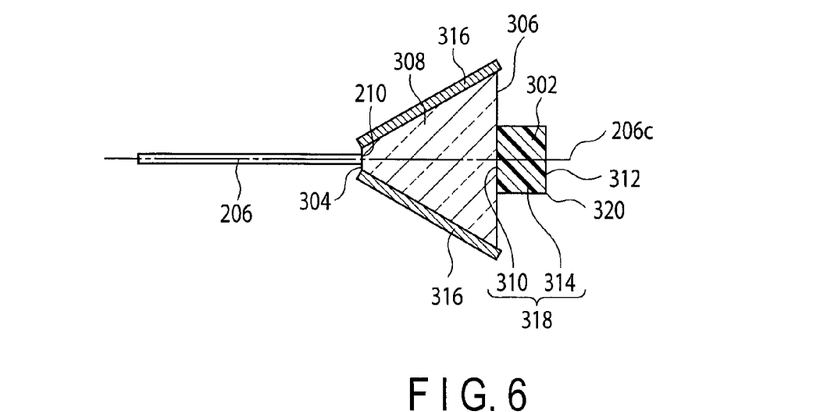
FIG. 6 is an enlarged cross-sectional view of a wavelength converting unit and a light guide member of a lighting apparatus according to a third embodiment of the present invention.

FIG. 6 illustrates an example in which a wavelength converting member 302 is placed in contact with a surface of a light transmitting member 308, located on an emitting portion 306, and the light transmitting member 308 has a circular truncated cone shape.

In this case, the emitting portion 306 is a whole area, which is not in contact with the wavelength converting member 302, of an emitting surface of the light transmitting member 308 with a circular truncated cone shape, and a whole external surface of the wavelength converting member 302 excluding a surface facing an excited light emitting end 210. Wavelength-converted light is emitted to the exterior from all the surfaces.

Adopting the above structure further simplifies the shape of the light transmitting member 308, and enables easy manufacturing.

Since the present embodiment adopts the structure in which the light transmitting member 308 contacts the wavelength converting member 302 only at a bottom surface 310 of the wavelength converting member 302, it is possible to provide lighting apparatus 100 that can be easily manufactured, in addition to the effect of the first embodiment.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:
1. A lighting apparatus comprising:
an excited-light source including an excited-light emitting end;
a wavelength converting unit, and
an optical fiber for transmitting excited light from the excited-light source to the wavelength converting unit, the optical fiber having a proximal end optically con- nected with the excited-light source and a distal end substantially in contact with the wavelength-converting unit;

wherein the wavelength converting unit includes:

an incident portion configured to be connected to the excited-light emitting end, and on which excited light emitted from the excited-light source is made incident;

a wavelength converting member configured to convert the excited light made incident on the incident portion into wavelength-converted light of a desired wavelength;

a light transmitting member configured to transmit the excited light and the wavelength-converted light, the light transmitting member having a body defined by an exterior surface;

a reflector layer configured to reflect at least part of the wavelength-converted light from the wavelength converting member; and an emitting portion configured to emit at least part of the at least part of the wavelength-converted light reflected by the reflector layer to outside without reentering the wavelength converting member, and wherein the reflector layer is provided on the exterior surface of the body of the light transmitting member and the wavelength converting member and the light transmitting member completely fill a cavity defined by the reflector.

2. The lighting apparatus according to claim 1, wherein the reflector layer and the wavelength converting member are arranged separately from each other, and the light transmitting member is provided between them.

3. The lighting apparatus according to claim 2, wherein the light transmitting member is glass or resin.

4. The lighting apparatus according to claim 3, wherein the body of the light transmitting member has one of a cylindrical shape and a circular truncated cone shape spreading from the incident portion toward the emitting portion.

5. The lighting apparatus according to claim 4, wherein the wavelength converting member includes a first area, at least part of which faces the excited-light emitting end, and the first area is disposed in contact with the light transmitting member.

6. The lighting apparatus according to claim 5, wherein the first area of the wavelength converting member includes a bottom surface of the wavelength converting member and a side surface of the wavelength converting member, the bottom surface facing the excited-light emitting end, and the side surface contacting the bottom surface.

7. The lighting apparatus according to claim 6, wherein the wavelength converting member has a cylindrical shape, in which the bottom surface has a generally circular shape, and the bottom surface of the wavelength converting member has a size larger than a beam spot formed on a plane including the bottom surface of the wavelength converting member by the excited light emitted from the excited-light emitting end.

8. The lighting apparatus according to claim 7, wherein the reflector layer is formed on the exterior surface of the light transmitting member, excluding at least the incident portion and the emitting portion.

9. The lighting apparatus according to claim 8, wherein an external surface of the reflector layer further includes a protective film.

10. The lighting apparatus according to claim 7, wherein the reflector layer is formed of metal.

11. The lighting apparatus according to claim 1, wherein at least part of the light transmitting member is continuously formed to extend from the incident portion to the emitting portion.

* * * * *